(12) United States Patent
Busch

(10) Patent No.: US 8,190,195 B2
(45) Date of Patent: May 29, 2012

(54) SYSTEM AND METHOD FOR DATA CORRELATION AND MOBILE TERMINAL THEREFOR

(75) Inventor: Reinhard Busch, Munich (DE)

(73) Assignee: Linguatec Sprachtechnologien GmbH, Munich (DE)

( * ) Notice: Subject to any disclaimer, the term of this patent is extended or adjusted under 35 U.S.C. 154(b) by 0 days.

(21) Appl. No.: 12/920,740

(22) PCT Filed: Mar. 3, 2009

(86) PCT No.: PCT/EP2009/052500
§ 371 (c)(1),
(2), (4) Date: Nov. 29, 2010

(87) PCT Pub. No.: WO2009/112398
PCT Pub. Date: Sep. 17, 2009

(65) Prior Publication Data
US 2011/0077048 A1    Mar. 31, 2011

(30) Foreign Application Priority Data
Mar. 3, 2008  (DE) .................... 20 2008 002 980 U

(51) Int. Cl.
*H04M 1/00* (2006.01)
(52) U.S. Cl. .................. 455/550.1; 455/418; 348/207.1; 358/400
(58) Field of Classification Search .................. 455/418, 455/550.1, 556.1; 348/207.1, 211.2, 211.3; 358/400
See application file for complete search history.

(56) References Cited

U.S. PATENT DOCUMENTS

| 6,330,975 | B1 | 12/2001 | Bunte et al. |
| 6,976,032 | B1 | 12/2005 | Hull et al. |
| 7,339,610 | B2 * | 3/2008 | Kusaka .................... 348/207.1 |

(Continued)

FOREIGN PATENT DOCUMENTS

DE  10 2006 050 409 A1  12/2007

(Continued)

OTHER PUBLICATIONS

International Preliminary Report on Patentability (Chapter II), corresponding to PCT/EP2009/052500, dated Dec. 29, 2010 (Translation).

(Continued)

*Primary Examiner* — Nhan Le
(74) *Attorney, Agent, or Firm* — Renner, Otto, Boisselle & Sklar, LLP

(57) ABSTRACT

The invention relates to a system for data correlation, having: a receiving device 1 having an image acquisition element 10 and a data set generator 12 for generating at least one object data set from at least one acquired first image, which represents a physical object, and an identification label, which uniquely determines an object-related acquisition procedure, and at least one information data set from at least one acquired second image, which represents coded information related to the physical object, and the identification label; a correlation device 2 for the extraction 20 of the coded information from the information data set, for the semantic analysis 22 of the extracted information, and for the generation of at least one combination data sets ε from the results of the semantic analysis, the extracted information, and the at least one object data set with the same identification label as the extracted information data set; and a user device 3 for the storage and further use of the combination data set.

32 Claims, 4 Drawing Sheets

U.S. PATENT DOCUMENTS

| | | | |
|---|---|---|---|
| 7,512,398 B2 * | 3/2009 | Chambers et al. | 455/411 |
| 7,564,482 B2 * | 7/2009 | Clarke et al. | 348/208.1 |
| 7,834,922 B2 * | 11/2010 | Kurane | 348/294 |
| 2003/0127519 A1 | 7/2003 | Ehrhart et al. | |
| 2004/0204144 A1 * | 10/2004 | Lim | 455/566 |
| 2006/0087687 A1 * | 4/2006 | Eom | 358/1.15 |

FOREIGN PATENT DOCUMENTS

| | | |
|---|---|---|
| DE | 11 2007 001 384 A5 | 3/2009 |
| EP | 2 027 699 A | 12/2007 |
| JP | 1783073 A | 6/2006 |
| WO | 93/14458 A1 | 7/1993 |
| WO | 03/001435 A1 | 1/2003 |
| WO | 2006/025797 A1 | 3/2006 |
| WO | 2006/124473 A2 | 11/2006 |
| WO | 2007/140745 A2 | 12/2007 |

OTHER PUBLICATIONS

International Search Report, corresponding to PCT/EP2009/052500, mailed Sep. 17, 2009 (in German and in English).

Written Opinion, corresponding to PCT/EP2009/052500, mailed Sep. 17, 2009 (in German only).

International Preliminary Report on Patentability, corresponding to PCT/EP2009/052500, dated Jun. 23, 2010 (in English).

* cited by examiner

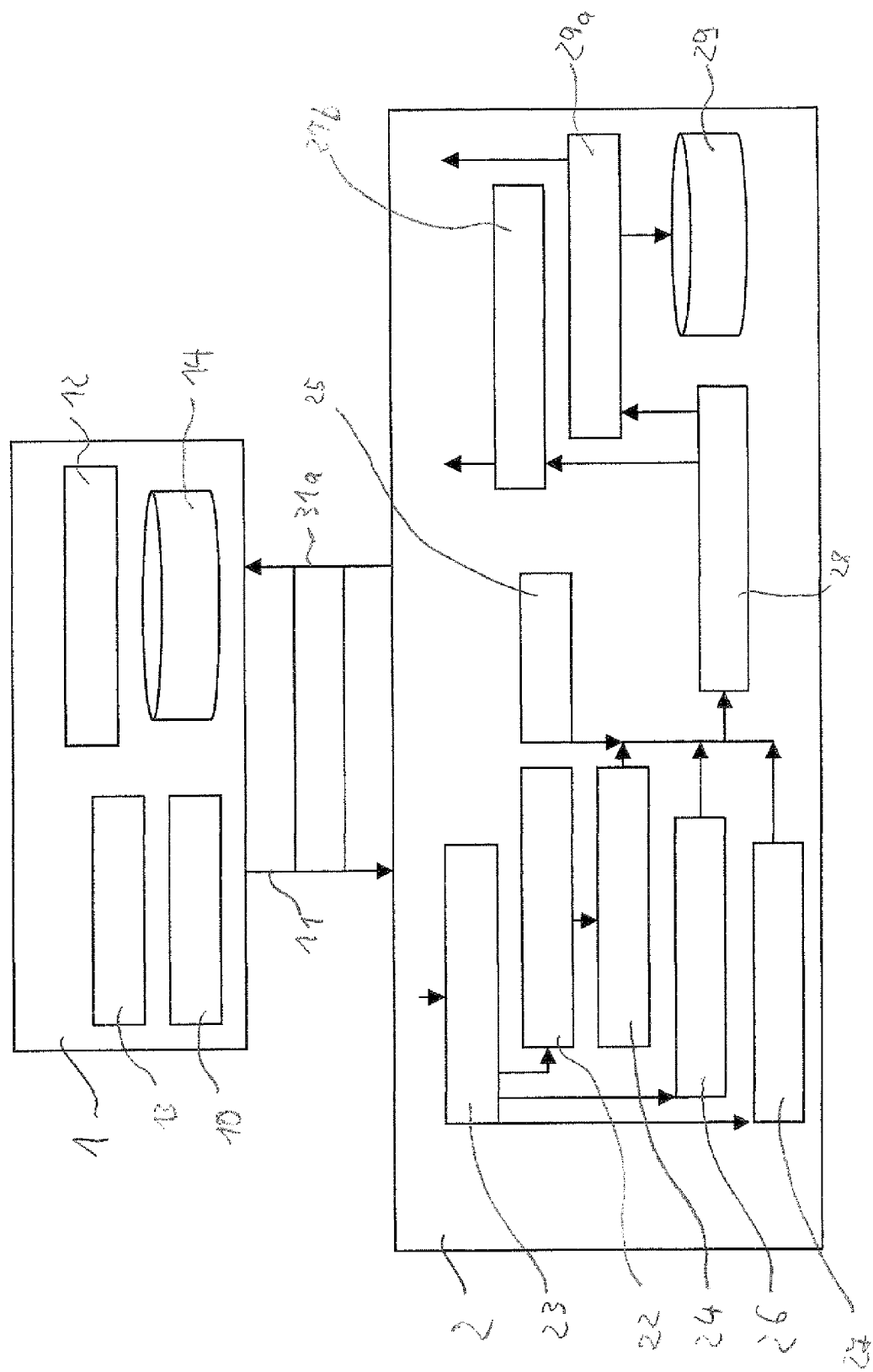

SYSTEM AND METHOD FOR DATA CORRELATION AND MOBILE TERMINAL THEREFOR

Automatic information generation and the correlation of different types of data—without any manual intervention by computer users—constitutes both a current challenge for data processing as well as a necessary line of attack in order to be able to cope with the continually growing quantity of data in electronic form in business life.

All areas of primary information acquisition are affected by this, including in particular, for example, the field of personal self organisation in business life. Here a wide variety of demands are made of corresponding computer programs which range from simple address management, via the combination of people with appointment data, to further-reaching properties and the field of information relating to contact persons. However, also in any other areas, for example scientific data evaluation, traffic control or production checks, the correlation of different types of data is required and can provide a significant improvement in the efficiency of corresponding procedures.

In the field of personal organisation, programs used include among others, for example, Microsoft's Outlook product which enables both appointment management and address management. Numerous further programs are in existence, for example e-mail programs or Internet search programs, which can also serve to manage business-relevant data. However, these mostly require manual input and manual management of data records, and so are laborious to handle. Thus, for example, the Mac OS X "Address Book" enables the integration of image data with contact persons, but these must be implemented by manual assignment of the address information to images stored in a different place.

Likewise, character recognition programs are known which extract specific address information from image information, for example scanned-in business cards by means of corresponding algorithms provided with artificial intelligence, and make accessible the semantic content of character strings, for example on business cards, and can optionally store them automatically in corresponding management programs, such as for example Outlook. However, no multimedia linking of different types of data takes place here either.

Therefore, the object forming the basis of the invention is to provide an approach with which—in particular also on mobile terminals with low computing power—the automatic correlation of different types of multimedia data is made possible.

This object is achieved by providing a system according to independent Claim 1, and a mobile terminal according to independent Claim 23.

Further advantageous embodiments, aspects and advantages of the invention can be found in the dependent claims, the following description and the attached drawings.

The idea forming the basis of the invention is to transmit different multimedia data acquired on a (generally autonomous) pick-up device or terminal for further evaluation and bundling of the different types of data to an efficient central computer, and to transmit the evaluated and combined data back to any device, optionally also to the originally used mobile device, to be used further by the user.

Correspondingly, the invention is directed at a system for data correlation having: a pick-up device having an image acquisition element and a data record generator for generating at least one object data record from at least one acquired first image which represents a physical object, and an identification label, which uniquely determines an object-related acquisition procedure, and at least one information data record from at least one acquired second image, which represents coded information related to the physical object, and the identification label; a correlation device for the extraction of the coded information from the information data record, for the semantic analysis of the extracted information, and for the generation of at least one combination data record from the results of the semantic analysis, the extracted information, and the at least one object data record with the same identification label as the extracted information data record; and a user device for the storage and further use of the combination data record.

In one preferred aspect, the coded information is text information.

In another aspect of the invention the correlation device has an optical character recognition unit for extracting the coded information from the information data record.

Preferably, the system is characterised in that the second acquired image depicts a business card or a comparable item, and the coded information is address information; and that the first acquired image is a depiction of the person whose address information is shown on the business card.

In an alternative aspect of the invention the second acquired image can be a product information label or a comparable item, and the coded information can be product information; and the first acquired image can be an image of a product, the product information of which is shown on the product information label.

In a further aspect the system is characterised in that the correlation device is separated spatially from the pick-up device and the user device, and is connected to these by at least one network.

Preferably, the at least one network is a radio network, for example a GSM, Bluetooth, WLAN or UMTS network.

With one preferred aspect of the invention the correlation device is connected to the pick-up device by means of a radio network, and to the user device by means of a cable network.

Preferably, the combination data record is in a format which can be read by address management programs, and the user device has at least one address management program for storing the combination data records.

Furthermore, in the system the pick-up device can acquire at least one piece of time information in order to establish at least one time at which the image data are acquired.

In a further aspect of the invention the correlation device serves to generate a second combination data record in a format that can be read by appointment management programs, and which includes the time information; and the user device has at least one appointment management program for the storage of the second combination data records.

Furthermore, the pick-up device can have a localisation unit for determining the location of the pick-up device, and the data record generator can serve to generate a localisation data record at the same time as generating the object data record and/or the information data record which includes location data and the same identification label as the object data record and/or the information data record, and the correlation device can be designed to generate combination data records, also using the localisation data record.

In a further aspect the pick-up device has an audio recording unit for recording audio data which are associated with the acquired physical object, and the data record generator serves to generate an audio data record which includes audio data and the same identification label as the object data record and/or the information data record, and the correlation device is designed to produce from the audio data record a speaker profile with characteristic audio properties of the acquired object.

According to another aspect of the invention the acquired object is a person, the audio data are speech data of the person, and the correlation device serves to use the speaker profile to allow messages which originate from the person and have been transmitted to the correlation device to be read out on the user device in acoustic form using a synthetic voice derived from the speaker profile for the person.

In one aspect the correlation device has a biometry unit for the biometric analysis of a person represented in the object data record.

The invention can be further characterised in that the correlation device has furthermore at least one information search unit for searching for further data on the Internet which relates semantically to the extracted information, to the results of the semantic analysis, and/or to the object data.

According to one aspect of the invention the further data can be contact data from contact platforms on the Internet.

The user device can, for example, be a personal computer of the user of the pick-up device.

Preferably, the pick-up device is an autonomous unit which can receive a connection to the correlation device in order to transmit data records.

In another aspect the system of the invention is characterised in that the user device and the pick-up device are realised in an autonomous unit.

Preferably, the invention is characterised in that the pick-up device is a mobile telephone.

If the coded information is address information, the correlation device can preferably be designed to produce from the address information which has been identified as a name by means of the semantic analysis an audio profile which is transmitted to the mobile telephone as a combination data record for the configuration of a speech selection control in said mobile telephone.

The invention is likewise directed at a mobile terminal having:
a pick-up device having an image acquisition element and a data record generator for generating at least one object data record from at least one acquired first image, which represents a physical object, and an identification label, and at least one information data record from at least one acquired second image which represents coded information related to the physical object, and the identification label; a transmitting/pick-up device for transmitting at least the object data record and the information data record to a correlation device for the extraction of the coded information from the information data record, for the semantic analysis of the extracted information, and for the generation of at least one combination data record from the results of the semantic analysis, the extracted information and the at least one object data record with the same identification label as the extracted information data record; and for receiving the at least one combination data record from the correlation device; and a user device for the storage and further use of the combination data record.

In a further aspect the mobile terminal is characterised in that the coded information is text information.

In another aspect the second acquired image represents a business card or a comparable item, and the coded information is address information; and the first acquired image is an image of the person whose address information is shown on the business card.

Preferably, the transmitting/pick-up device has an interface in a radio network standard, for example in the GSM, Bluetooth, WLAN or UMTS radio network standard.

The mobile terminal can preferably be characterised in that the at least one combination data record has further data from the Internet which relate semantically to the extracted information, to the results of the semantic analysis, and/or to the object data.

The mobile terminal according to the invention can be characterised in that the further data are contact data from contact platforms on the Internet.

In yet another aspect the combination data record is in a format which can be read by address management programs, and the user device has at least one address management program for the storage of the combination data records.

The system according to the invention can also be characterised in that the pick-up device further acquires at least one piece of time information in order to establish at least one time at which the image data are acquired.

One aspect is characterised in that the transmitting/pick-up device serves to receive a second combination data record from the correlation device in a format that can be read by appointment management programs, and which includes the time information; and the user device has at least one appointment management program for the storage of the second combination data records.

A further aspect is characterised in that the pick-up device further has a localisation unit for determining the location of the pick-up device, and the data record generator serves to generate a localisation data record at the same time as generating the object data record and/or the information data record and the location data, and includes the same identification label as the object data record and/or the information data record, and that the combination data records also include information from the localisation data record.

Furthermore, one aspect of the invention is characterised in that, if the coded information is address information, it is intended to receive a combination data record which includes an audio profile which is produced from the address information which has been identified as a name by means of the semantic analysis, the combination data record being intended to configure a speech selection control in the mobile terminal.

Finally, the invention is also directed at a method for data correlation having the following steps:
in a pick-up device with a image acquisition element:
acquiring a first image which represents a physical object, acquiring a second image which represents coded information relating to the physical object, generating at least one object data record from at least one acquired first image and an identification label which uniquely determines an object-related acquisition procedure, and generating at least one information data record from at least one acquired second image and the identification label;
in a correlation device:
extracting the coded information from the information data record, semantic analysing of the extracted information, and generating at least one combination data record from the results of the semantic analysis, the extracted information and the at least one object data record with the same identification label as the extracted information data record; and
in a user device:
storing and further using the combination data record.

Everything that has been said with regard to the other characteristics of the invention applies in the same way to the method according to the invention, and so reference is made alternately. Furthermore, it is to be understood that the invention includes all aspects of the method which have been described in relation to the system and the terminal of the invention.

In the following the invention is to be described more specifically, reference being made to the attached drawings in which is shown as follows:

FIG. 2 is a detailed view of the individual components which constitute the invention.

Figure 1:
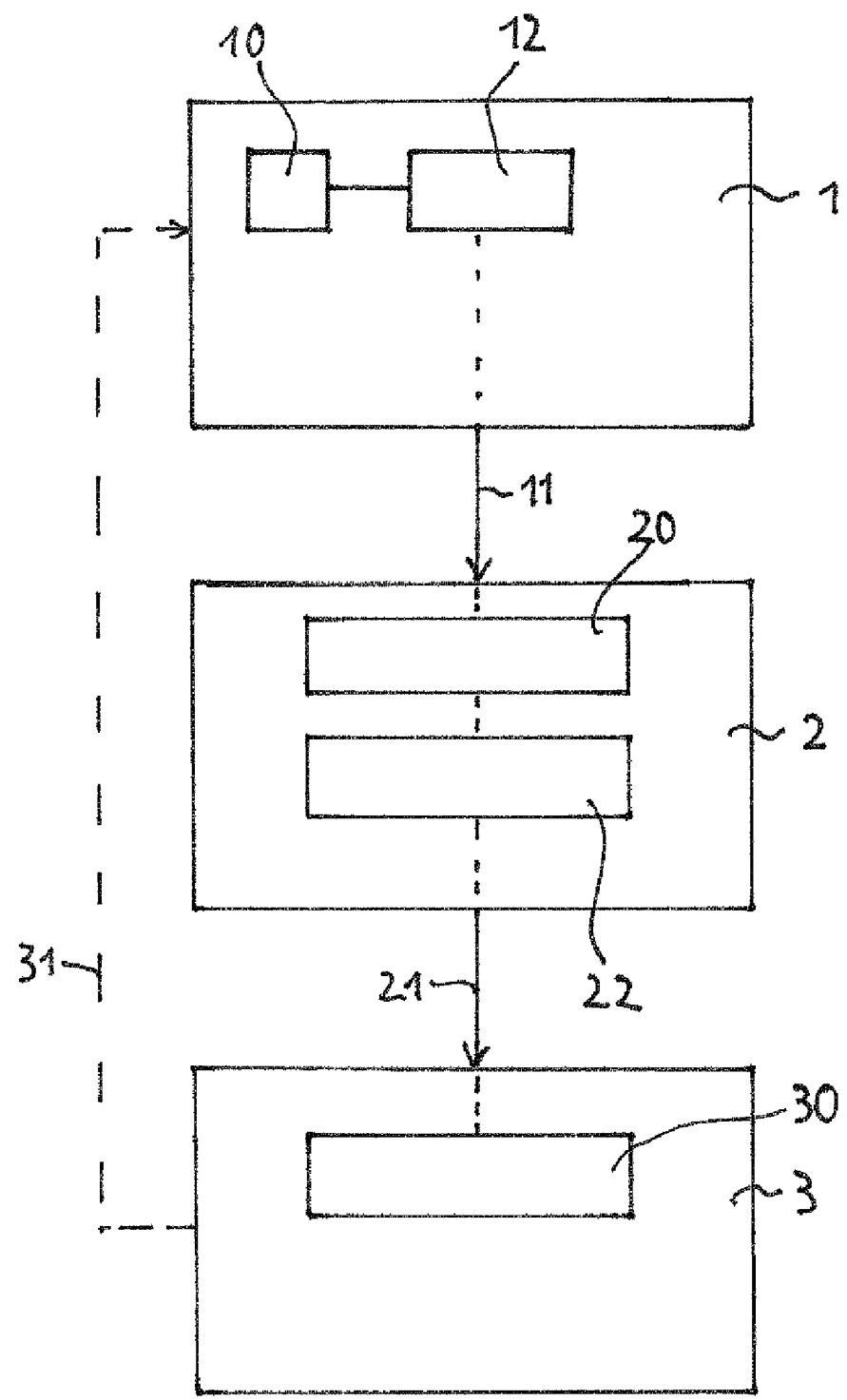
FIG. 1 is a rough diagrammatic overview of the elements of the invention.

As specified at the start, the invention is based upon the idea of saving resources in a small mobile device by relocating complex calculating operations in the run-up to data correlation to an efficient computer which, in addition, has further reaching capabilities than a personal user or pick-up device.

One can also understand the invention to the effect that by means of technical means acceleration or even only enabling of evaluation processes is achieved, it being the case that the time required when considering a particular user terminal for data processing, which is made up of the duration of the program for acquiring an image, preparation for transmitting the data to a correlation computer, transmission time, evaluation time in the correlation computer, transmission time back to a user device, and storage time on the user device, is shorter than the period that would be required using as the basis the same pick-up device and/or user device if the correlation of the image data and processing thereof, either only on the display device, only the user device or, for example with a combined receiving/user device, with the process taking place exclusively in the latter.

The invention uses up to three different units—a pick-up device, a correlation device and a user device, with particular embodiments the pick-up device and the user device possibly being combined in one unit, for example a mobile telephone, a PDA, etc.

The pick-up device has an image acquisition element, such as for example a camera or a scanner, and a data record generator, which from the first and second images received by the image acquisition element generates object data records which are intended for transmission to a correlation device. Here the data record generator can be a special device within the pick-up device, or be implemented by means of a program that can run on a microcontroller etc.

Since with the invention physical objects are to be correlated with coded information, it is necessary to acquire promptly an image of the physical object to be acquired, and an image of a data carrier which contains the coded information, and to transmit these to the correlation device. The physical object can be any object which can be represented by an image, such as for example a person, a purchasable product or a car in the flow of traffic. The coded information, which is also to be acquired with the image acquisition element in order to generate a second recording, can be any type of coded information which relates in some way to the object. It is, therefore, conceivable that, if the objects to be correlated are people, the coded information is business cards, letter heads, nameplates on doors, etc of the latter. With purchasable products the coded information can, for example, be a display in a display window or a shop which shows the type of product and the price. For the acquisition of cars the coded information can be, for example, the car's registration number. In this case it may be advantageous to acquire just one image primarily which is then already broken down within the pick-up device into a sub-area "car driver" and a sub-area "registration number". It is also possible to simply transmit the image information twice, once in order to show the physical object, and the second time in order to assess the coded information if, for example, only one image of a motor vehicle with a registration number is available.

The identification label, which is added to the data records, can be any suitable label. It can, therefore, be numbering which the data record generator generates specially, but also simply an identifier of the pick-up device which with each data connection is automatically sent with the data packets, etc. Finally, the identification label can also be the time of transmitting or receiving the data records in the correlation device. The term "generation of a ... data record from ... an identification label" is then to be understood to the effect that the label is implicitly added by the time of transmission or receipt, and correspondence of the identification labels between the at least two data records can then be defined, for example, such that both are received by the correlation device within a limited, defined period.

According to the invention presented here the correlation devices undertakes the main part of the evaluation by, in a basic embodiment of the invention, the coded information initially being extracted from the information data record, for example with the aid of optical character recognition commonly used by persons skilled in the art. This coded information can be text information, character information, bar codes, or other computer-readable coded information. It is the aim of the extraction to transfer the coded information available as pixels in a form which can be read by the user, i.e. for example text information, or which can be used by computers for further utilisation. Examples of coded information which can be used directly by computers, in addition to text information which can be used for comparison with information found in data banks, the WWW etc., is also information such as URLS or geographical information according to geographical information systems.

FIG. 1 shows the basic components of the system according to the invention. Here a pick-up device 1 is connected to the correlation device 2 by means of a connecting section 11 which can be a fixed connection or a radio connection, and the correlation device 2 is connected to the user device 3 by means of a network connection 21. The pick-up device 1 comprises a camera 10 and a data record generator 12 for producing the different data records which are transmitted via the connection 11 to the correlation device 2, where an extraction unit 20 extracts the coded information and a combination data record is generated in the correlation unit 22. The user device 3 can then optionally establish, in turn, a connection with the pick-up device 1, via any connection 31, in order to synchronise a data bank 30 for storage of the combination data records to a corresponding data bank (not shown) in the pick-up device. The connection 31 can, for example, be a synchronisation cable between a mobile telephone and a user's PC.

With particularly preferred embodiments one is concerned with an approach for acquiring a dialogue partner by means of data technology wherein on the one hand an image of a head or its face, and on the other hand a dialogue partner's business card is received by means of the image acquisition element of the pick-up device, and in the correlation device the address information of the person is determined according to the business card, for example his name, the company for which he works, his private and business address, telephone number, e-mail address, and any further information provided on the business card. It is also possible to identify a company logo as such by means of appropriate algorithms, and also to add the address information as image information.

In a further preferred embodiment the invention is used to carry out product research on products which a user of the data correlation system finds interesting. For this purpose, on the one hand the product is photographed, and on the other hand an information sign, for example in a display window, a product image and product information sign are then forwarded, and the correlation device can identify the product and convey this to this user in this form, optionally enhanced with further information, at the user device.

One preferred aspect of the invention can be seen to be that by means of decoupling between the correlation device on the one hand and the pick-up device/user device on the other hand, it is also made possible to implement complex data evaluations with small devices, such as for example cameras, laptops, PDAs or mobile telephones, and to display the results thereof on the corresponding devices. In this way, in comparison to the extremely high computing powers otherwise required in order to carry out complex correlation analyses, the users' mobility is considerably improved, and it is actually possible for the first time to make available to users the demanding correlation activities.

Preferably, for the transmission of data between the pick-up device and optionally between the correlation device and the user device a radio network is used in order to further increase the spatial independence of the user. This type of radio network can be, for example, a WLAN network if, for example within a limited spatial area, such as a company premises, data correlations are to be carried out; or the GSM network which has meanwhile become available worldwide, or the UMTS network to be found in the system, with the latter either mobile telephones or corresponding GSM or UMTS modules being used in correspondingly configurable devices such as PDAs or laptops. With a further possible embodiment the correlation device and the user device are connected to one another by means of a fixed network, for example if the user device is a user's PC which is kept at the latter's home or office, and to which the information is primarily transferred. In this case it is possible, for example, to transfer the information to mobile devices at a later point in time, in so far as this is desired. It is therefore possible, even in cases in which the pick-up device could in principle also function as a user device, to make this functionality available not on a radio network basis, but by means of synchronisation, which takes place later, with the primary user device to which the correlated data are transmitted.

In particular it is preferred if the pick-up device is an autonomous unit which can accommodate a connection to the correlation device for the transmission of data records. This is to be understood to mean a device which functions totally independently, both with regard to its power supply and with regard to its functionality, and which moreover can function with and without an established network connection. A typical example of this type of autonomous unit is a mobile telephone.

The pick-up device can be a separate unit which only has the functions described in the invention. Moreover, it can also be a combined unit wherein the whole thing consists of the actual pick-up device and a part for transmitting the information to the correlation device, such as for example a GSM module. Moreover, it can be fully integrated so that the pick-up device can be, for example, part of a mobile telephone, the camera contained in the mobile telephone, for example, working as an image acquisition element, and the microprocessor of the mobile telephone allowing a program to run which implements the functionality of the camera control and the data record generator.

In a particularly preferred aspect of the invention not only are the primary data generated by the pick-up device evaluated and correlated with one another, but moreover an information search unit is provided in the correlation device which is capable, by means of specific search algorithms, to obtain further information from other databases upon the basis of the extracted coded information, and optionally the image information. These external databases can be, for example, data banks in a server or data available on the Internet. No limits are set here for the implementation, and any algorithms are conceivable for searching for practically any information on the acquired physical object. In addition to the extracted, coded information further image information can be obtained, for example, from the object data record, by for example, if the acquired object is a person, biometric analyses of the face being carried out, and the biometric data thus obtained being compared with biometric data likewise obtained from images on the Internet, in order to obtain further information about a person with the same name and the same biometric data, from which it can be assumed that, independently of the name, it is actually the dialogue partner who was acquired with the pick-up device. In this way, for example, information can be obtained regarding whether a specific dialogue partner has worked for companies, for which company he is currently working, and which further functions he fulfils here, whether he has come to light in any other way, and information about his private life can also be obtained if, for example, he is represented by a personal website on the Internet. In this way it is possible for the user to establish more personal contact with a dialogue partner in subsequent dialogues, even on a private level.

In order to enable integration of the invention presented into existing data processing infrastructures, it is furthermore preferred if the combination data record is generated in a format which can be read by conventional address management programs on the user device, and that in accordance with the user device has at least one address management program for storage of the combination data records. Typical examples of these programs are Microsoft Outlook and the MAC OS X Address Book.

In further preferred embodiments the pick-up device can generate additional data, partially also dependently upon the hardware available in the pick-up device, and likewise transmit it to the correlation device. An example of this additional information is the time of receiving the image data by means of a clock in the pick-up device, which can be sent to the correlation device, either as a further time data record, or also integrated into the object data record and information data record.

In such a case it is possible, furthermore, for the correlation device to also be used to generate a second combination data record in a format which can be read by appointment management programs, and which includes the time information in a corresponding format, the user device correspondingly having to have this type of appointment management program for storage of the second combination data record. Therefore, it is possible here to use conventional appointment management programs in order, for example, to file, in the manner of a diary, the time of a meeting with the person that is acquired by the pick-up device, so that it is possible at a later point in time for the user to research at what times he met with a person. In an extended functionality it is also possible, with multiple acquisition of the same person, for the correlation device in any case to be also capable, by means of just one image of the person himself and a biometric evaluation of his features, of drawing on previously stored appointment information about this person, and to inform the user of when he respectively already made contact with this person. This can also be a considerable advantage in business dealings involving personal association with a dialogue partner.

A further possible extension of the pick-up device consists of the latter further having a localisation unit for determining the location of the recording device. This can be, for example, a GPS system, but also a different method for determining the location of the pick-up device, for example via the GSM radio network (cell localisation) or via a WLAN localisation by means of known W-LAN router co-ordinates. In such a case the data record generator also serves to generate a localisation data record at the same time as generating the object data record and/or the information data record which includes location data and the same identification label as the object data record and/or the information data record, the location data being understood as the data regarding the location of the pick-up device at the time of acquiring the physical object and the coded information. The correlation device is designed to also generate combination data records using the localisation data record so that the corresponding combination data records further include information regarding where the data acquisition was implemented. In this way it is possible, with regard to a meeting, to not only record the person, but also the time and the location, and to make this available later, for example via a data bank on the correlation device or via appointment administration/address programs on the user device.

As already stated, the extracted data can be further used in many ways in order to establish even more correlations with third-party data. One possible further user application is to produce an audio profile from the information of a business card or a similar data carrier identified as a name, i.e. a spoken version of the name which is transmitted to a mobile telephone as a further combination data record for the configuration of a speech selection control in a mobile telephone in a format suitable for this mobile telephone where it can be integrated, either manually or automatically, into the automatic speech selection.

In a further preferred embodiment of the invention an audio recording unit, for example comprising a microphone and a digital signal processor, can be contained within the pick-up device, with which audio data on the physical object recorded, for example speech of a contact person or a characteristic noise of a product, etc. can be recorded. The data record generator can then also generate an audio data record or integrate the audio data into the information data record or the object data record. Preferably, this type of audio data record includes the same identification label in order to enable the correlation, and is used, for example, in the correlation device in order to produce a speaker profile with audio properties of the acquired object, for example the characteristic properties of his speech. Needless to say the audio data record can also be used for other purposes, such as for searching for similar information on the Internet etc. It is also possible to acquire audio data as spoken notes, and to store the latter either as such or transform them by means of appropriate speech recognition into text data.

This type of speaker profile, which should record the characteristic manner of speaking and voice of a person, can also serve to prepare text messages originating from this person in the correlation device as a speech message, and to transmit the "read out" text with the voice of the respective transmitter from the correlation device to the user device so that a message originating from a person can be read out here with the voice of the latter. One special application of this advantageous embodiment can be with small devices with which the messages can not be read, but only heard, either for reasons relating to a small display or due to the current mobility of the user of the user device. Therefore, a transformation of a text message, such as an SMS or an e-mail into a "voicemail" message is practically possible, the peculiarity then being that the message is at least apparently spoken directly by the person from whom it originates. In an extension of this embodiment the image information on the person can also be used in order to generate a speaking avatar with the appearance of the person.

In the following a prototypical workflow for the use of the invention is described in a non-restrictive way.

A user using the invention has a business appointment and meets one or more business partners here. With his pick-up device, for example a mobile telephone with a camera, he takes a photo of the business card and the face of each of the dialogue partners and transmits the latter to the correlation device. According to the data of the corresponding program in the mobile telephone with a camera this can also take place automatically. It is optionally possible, especially with mobile telephones which always have available a microphone function, to record part of the discussion, the audio data generated in this way also being transmitted to the correlation device. With mobile telephones which have available a navigation possibility, such as for example a GPS unit or a Bluetooth connection with a GPS interface, or via WLAN etc., it is further possible to record the location at which the discussion takes place, and also to transmit this to the correlation device.

On the correlation device, which is generally a server operated by a program specialising in the service illustrated, the photos and the business card (information data record) are transformed by means of OCR software into text. With the aid of a special program which has, for example, features of an artificial intelligence program, interpretation of this extracted raw text information then takes place in order to discover the information units contained therein, such as surname, first name, company, telephone number, e-mail address etc. This can, for example, be special intelligence for "named entity recognition".

If time information has also been transmitted, this time information can be evaluated in order to clarify the question regarding when the meeting took place. Furthermore, if available, an evaluation of the position co-ordinates and a transformation also into specific location information take place, for example by means of a data bank which correlates GPS co-ordinates with addresses or specific named buildings (GEO tagging) in order to clarify the question regarding where the meeting took place.

In a preferred embodiment a comparison can be made between the contact person, who was acquired at the meeting, and publicly accessible contact networks, such as for example XING, Facebook and similar, and optionally additional enhancement of the contact data with the correspondingly discovered information can take place in order to generate a more complex combination data record with richer content. The comparison takes place on the one hand by means of names, and if required the address of the contact person, and optionally also by means of the image of the person, as included in the object data record, for this sort of image comparison similarities being obtained by means of biometric features between the person and details in the contact network. It should be noted that contact networks often enable the production of portrait images of the persons filed here.

Following implementation of all of these correlation and research steps in the correlation device, at least one combination data record is now produced. This can be, for example, an address formula with all of the information found in a format which can be processed by address management programs such as Outlook. In addition, a further combination data record in the form of an appointment form can also be produced which contains the information found, or at least part of the information found, in a format that can be processed by appointment management programs. In this way it is possible to incorporate all of the data established and correlated seamlessly into already existing address management programs and appointment management programs in order to make them accessible in the way familiar to the user. The corresponding address and appointment forms are then downloaded as combination data records into the respective address management program, either on the user's PC or directly into a PDA or a mobile telephone, and can be read here by the corresponding programs. If the data are initially downloaded onto the PC, it is then also possible to rerecord the information onto the mobile device in the course of the next synchronisation of the PDA/mobile telephone with this PC.

Furthermore, it is possible to generate from the face profile and the audio data a combined avatar of the respectively acquired business partner that has the appearance and the voice of this business partner. In this way it is possible for incoming messages from the business partner to be read out by the latter multimedially and with the appropriate face movements for the speech read out. This is possible for e-mails, SMS or chat functions.

FIG. 2 shows a detailed illustration of the pick-up device and the correlation device according to the invention. The same reference numbers identify the same objects here. In this case the pick-up device is a mobile telephone 1 which has a conventional camera device 10, and in this specific case implemented in the software, a data record generator 12. Furthermore, there can be found in the mobile telephone 1 a GPS system 13, as well as a local organiser with an address and appointment function 14.

Transmission is implemented by means of conventional radio standards, for example by means of GSM, including EDGE or further developments of Edge, or UMTS, including further developments such as HSDPA, a logical connection, for example in the form of an http section, being established in the latter, so that the whole functionality can be implemented within an Internet browser provided in the mobile telephone 1 which uses, for example, as a transmission protocol http, and in order to implement the software Java or JavaScript etc.

There can initially be found on the server (correlation device) 2 an authentication unit 23 which verifies the authenticity and origin of the incoming data records. An OCR software 22 then extracts the text included in the information data record or any other coded data, and passes this on to an analysis software 24 which carries out a semantic analysis. Subsequently, the object data record, i.e. generally a photo of the object which is shown as 25 here, is combined with the semantically analysed text information in order to form one combination data record. Further information in the form of GEO tagging by means of a corresponding localisation unit 26 and the integration of open source info 27 finally lead to the production of one or more combination data records in an integration unit 28. These can be passed on to a data bank 29 in the correlation device for later use and the correlation of subsequent results, and/or can be used in order to produce organiser import data records 29a which can be transmitted back via the section 31a to the mobile telephone 1, and also to a user device 3 via another connection 31, and which can also form the basis for storage in the organiser data bank 29. A further function of the invention is shown by box 29b where from the newly acquired information and any information already acquired at an earlier time, including contact information taken from the Internet, information about earlier meetings, or manually inputted additional information, an overall partner profile of the business partner, whose business card and photo have been recorded in the mobile telephone 1, is produced and provided to the user for further use.

A very similar device is also used for a functionality with which instead of a business partner acquisition, a product acquisition takes place, it being possible here for additional information to be obtained, not with biometric profiles, but for example with characterising features of the photographed product, and with the coded information with details of the product name or product code. It is then not a partner profile, but a product profile that is produced which can, for example, also contain details regarding where the desired product can be obtained more cheaply than has just been seen.

Figure 3A:
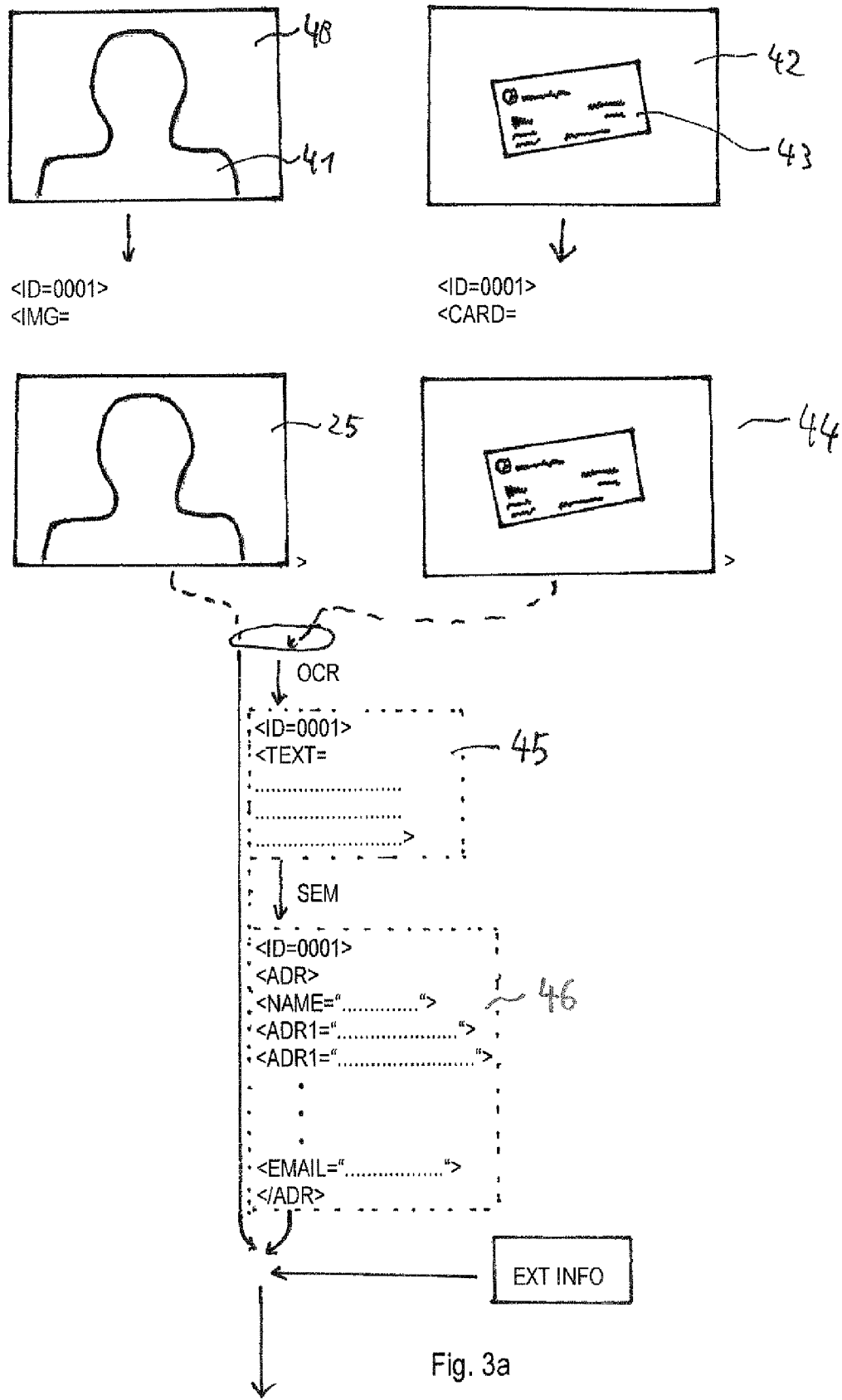
FIG. 3 is a data flow chart in order to illustrate the regulation of the different types of data records.

FIG. 3 shows in a highly schematised illustration the possible transformation steps for the acquired data. FIG. 3a initially shows here in its upper section, identified by a (recording device), the acquisition of an image 40 which shows a person, for example a business partner 41, and a second photo 42, which shows a business card of this business partner 43. Both images transformed by the data record generator into files has attached to it in the given example an ID=0001 in order to be able to correlate them uniquely by this identification label. In this way a file/a data record 25 in the form of an object data record, and a file/a data record 44 as an information data record are produced. The symbolically used data format relies upon HTML, but it is to be understood that any formats can be used, including XML and totally proprietary formats. The illustration is only supposed to serve to illustrate the basic principles of the invention.

These data records are then sent via connection line 11 on to the correlation device shown schematically in the lower part of FIG. 3a and identified by "K". Initially, optical character recognition, identified by OCR, is implemented which leads to an extracted data record 45 in which, instead of a photo, details of the text recognised therein are contained.

Figure 3B:
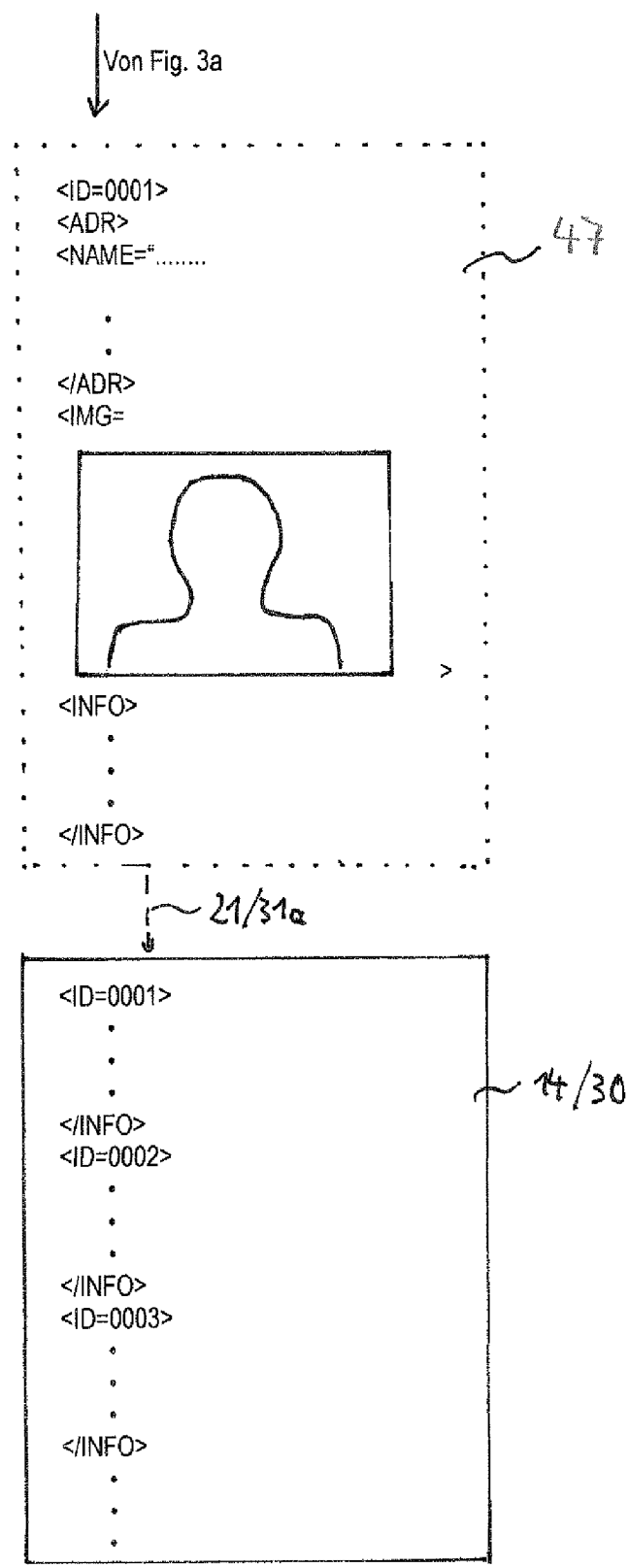

Subsequently, a semantic analysis, identified by SEM, is carried out, by means of which it is established which parts of the text, which has been obtained by means of optical character recognition, can have which semantic meaning, such as for example the name of the business partner, his different addresses, e-mail details, etc. A further data record 46 is produced, which in the given example which is not to be considered restrictively, in turn contains tags in a way similar to HTML for name, address, e-mails etc. In the subsequent step further information from external sources (EXT INFO) can be discovered by means of corresponding analysis methods, for example Internet networking services, manufacturers' websites, company profiles, which can be found on the Internet etc., and this information is combined with the data record 45 and the object data record 25, processed to form a combination data record which is identified in FIG. 3b as 47, and which in the given example, not to be considered as restrictive, includes, apart from an identification label <ID=001> (which can also be left out in this phase), an area for the address information, an area for the image of the acquired person, and an area <info> for any additional external information. These are transmitted via the connection section 21 or via a feedback section 31a to the user device, which can also be identical to the pick-up device, in order to be stored here in a local data bank 14 or 30 together with further information of the same type. Not shown in FIG. 3b are the extended possibilities, for example for the integration of time and location information, or the production of additional data records for the integration not only into address data banks, but also into appointment management programs.

The invention claimed is:

1. A method for data correlation having the steps:
in a pick-up device with an image acquisition element that is included in a mobile terminal:
acquiring a first image, which represents a physical object,
acquiring a second image, which represents coded information relating to the physical object,
generating at least one object data record from at least one acquired first image and an identification label which uniquely determines an object-related acquisition procedure,
generating at least one information data record from at least one acquired second image and the identification label;
in a correlation device spatially separate from the mobile terminal and connected thereto by means of at least one network:
extracting the coded information from the information data record,
semantic interpretative analysing of the extracted information in order to establish which parts of the extracted information have which semantic meaning, and
generating at least one combination data record from the results of the semantic analysis, the extracted information and the at least one object data record with the same identification label as the extracted information data record; and
in a user device which is included in the mobile terminal:
storing and further using the combination data record.

2. A system for data correlation, having:
a mobile terminal having a pick-up device and a user device,
a correlation device which is spatially separate from the mobile terminal and is connected therewith by means of at least one network;
the pick-up device having: an image acquisition element and a data record generator for generating at least one object data record from at least one acquired first image which represents a physical object, and an identification label, which uniquely determines an object-related acquisition procedure, and at least one information data record from at least one acquired second image, which represents coded information related to the physical object, and the identification label;
the correlation device serving to extract the coded information from the information data record, for the semantic interpretation analysis of the extracted information in order to establish which parts of the extracted information have which semantic meaning, and to generate at least one combination data record from the results of the semantic analysis, the extracted information, and the at least one object data record having the same identification label as the extracted information data record; and
the user device serving to store and further use the combination data record.

3. The system according to claim 2, wherein the coded information is text information.

4. The system according to claim 3, wherein the second acquired image depicts a business card or a comparable item, and the coded information is address information; and that the first acquired image is a depiction of the person whose address information is shown on the business card.

5. The system according to claim 3, wherein the second acquired image represents a product information label or a comparable item, and the coded information is product information; and that the first acquired image is an image of a product, the product information of which is shown on the product information label.

6. The system according to claim 5, wherein the correlation device is connected to the pick-up device by means of a radio network, and to the user device by means of a cable network.

7. The system according to claim 2, wherein the correlation device has an optical character recognition unit for extracting the coded information from the information data record.

8. The system according to claim 2, wherein the at least one network is a radio network, for example a GSM, Bluetooth, WLAN or UMTS network.

9. The system according to claim 2, wherein the combination data record is in a format which can be read by address management programs, and the user device has at least one address management program for storing the combination data records.

10. The system according to claim 2, wherein the pick-up device furthermore acquires at least one piece of time information in order to establish at least one time at which the image data are acquired.

11. The system according to claim 10, wherein the correlation device serves to generate a second combination data record in a format that can be read by appointment management programs, and which includes the time information; and the user device has at least one appointment management program for the storage of the second combination data records.

12. The system according to claim 2, wherein the pick-up device further has a localisation unit for determining the location of the pick-up device, and the data record generator serves to generate a localisation data record at the same time as generating the object data record and/or the information data record which includes location data and the same identification label as the object data record and/or the information data record, and that the correlation device is designed to generate combination data records, also using the localisation data record.

13. The system according to claim 2, wherein the pick-up device has an audio recording unit for recording audio data which are associated with the acquired physical object, and the data record generator serves to generate an audio data record which includes audio data and the same identification label as the object data record and/or the information data record, and that the correlation device is designed to produce from the audio data record a speaker profile with characteristic audio properties of the acquired object.

14. The system according to claim 13, wherein the acquired object is a person, the audio data are speech data of the person, and the correlation device serves to use the speaker profile to allow messages, which originate from the person and have been transmitted to the correlation device, to be read out on the user device in acoustic form using a synthetic voice derived from the speaker profile for the person.

15. The system according to claim 2, wherein the correlation device has a biometry unit for the biometric analysis of a person represented in the object data record.

16. The system according to claim 2, wherein the correlation device further has at least one information search unit for searching for further data on the Internet which relates semantically to the extracted information, to the results of the semantic analysis, and/or to the object data.

17. The system according to claim 16, wherein the further data are contact data from contact platforms on the Internet.

18. The system according to claim 2, wherein the user device is a personal computer of the user of the pick-up device.

19. The system according to claim 2, wherein the pick-up device is an autonomous unit which can receive a connection to the correlation device in order to transmit data records.

20. The system according to claim 2, wherein the pick-up device is a mobile telephone.

21. The system according to claim 20, wherein if the coded information is address information, the correlation device is designed to generate, from the address information which has been identified as a name by means of the semantic analysis, an audio profile which is transmitted to the mobile telephone as a combination data record for the configuration of a speech selection control in said mobile telephone.

22. A mobile terminal, having:
- a pick-up device having an image acquisition element and a data record generator for generating at least one object data record from at least one acquired first image, which represents a physical object, and an identification label, and at least one information data record from at least one acquired second image which represents coded information related to the physical object, and the identification label;
- a transmitting/pick-up device for transmitting at least the object data record and the information data record to a correlation device spatially separate from the mobile terminal and connected thereto by means of at least one network, for the extraction of the coded information from the information data record, for the semantic interpretation analysis of the extracted information in order to establish which parts of the extracted information have which semantic meaning, and for the generation of at least one combination data record from the results of the semantic analysis, the extracted information and the at least one object data record with the same identification label as the extracted information data record; and for receiving the at least one combination data record from the correlation device; and
- a user device for the storage and further use of the combination data record.

23. The mobile terminal according to claim 22, wherein the coded information is text information.

24. The mobile terminal according to claim 22, wherein the second acquired image is a business card or a comparable item, and the coded information is address information; and that the first acquired image is an image of the person whose address information is shown on the business card.

25. The mobile terminal according to claim 22, wherein the transmitting/pick-up device has an interface in a radio network standard, for example in the GSM, Bluetooth, WLAN or UMTS radio network standard.

26. The mobile terminal according to claim 22, wherein the at least one combination data record has further data from the Internet which relate semantically to the extracted information, to the results of the semantic analysis, and/or to the object data.

27. The mobile terminal according to claim 26, characterised in that wherein the further data are contact data from contact platforms on the Internet.

28. The mobile terminal according to claim 22, wherein the combination data record is in a format which can be read by address management programs, and the user device has at least one address management program for the storage of the combination data records.

29. The mobile terminal according to claim 22, wherein the pick-up device further acquires at least one piece of time information in order to establish at least one time at which the image data are acquired.

30. The mobile terminal according to claim 29, wherein the transmitting/pick-up device serves to receive a second combination data record from the correlation device in a format that can be read by appointment management programs, and which includes the time information; and the user device has at least one appointment management program for the storage of the second combination data records.

31. The mobile terminal according to claim 22, wherein the pick-up device further has a localisation unit for determining the location of the pick-up device, and the data record generator serves to generate a localisation data record at the same time as generating the object data record and/or the information data record and the which includes location data, and includes the same identification label as the object data record and/or the information data record, and that the combination data records also include information from the localisation data record.

32. The mobile terminal according to claim 22, wherein, if the coded information is address information, it is intended to receive a combination data record which includes an audio profile which is produced from the address information which has been identified as a name by means of the semantic analysis, the combination data record being intended to configure a speech selection control in the mobile terminal.

* * * * *